United States Patent [19]
Thompson

[11] 3,725,156
[45] Apr. 3, 1973

[54] IGNITION COMPOSITION INITIATED BY WATER

[75] Inventor: Tommy Lewis Thompson, Melbourne, Fla.

[73] Assignee: Life Support, Inc., Melbourne, Fla.

[22] Filed: Apr. 28, 1971

[21] Appl. No.: 138,326

[52] U.S. Cl. ..........................149/81, 149/75, 149/77
[51] Int. Cl. ............................................C06b 11/00
[58] Field of Search..............................149/75, 77, 81

[56] References Cited

UNITED STATES PATENTS

| | | | |
|---|---|---|---|
| 1,339,148 | 5/1920 | Weisgerber | 149/81 |
| 2,995,526 | 8/1961 | DeMent | 149/75 |

*Primary Examiner*—Stephen J. Lechert, Jr.
*Attorney*—Hill, Sherman, Meroni, Gross & Simpson

[57] ABSTRACT

An ignition cone composition including an alkaline metal or alkaline earth metal iodide or oxyiodide in combination with a principal oxidizer consisting of an alkaline metal mono-oxide and usually, an auxiliary oxidizer consisting of one or more alkaline metal and alkaline earth metal peroxides and chlorates which term includes the chlorates and perchlorates. This composition is included as a separate top layer in compressing a chemical oxygen generator composition or other composition to be ignited by the ignition cone compositions. In the preferred form, a water filled fracturable vial is associated with said layer so that upon fracture, the water causes initiation of said ignition cone composition, usually best preformed through the use of an uncompacted or loose powder first fire composition of similar content as said ignition cone composition.

11 Claims, No Drawings

IGNITION COMPOSITION INITIATED BY WATER

BACKGROUND OF THE INVENTION

1. Field of the Invention

This invention relates to a composition for an ignition cone and more particularly to a composition containing metal salts of iodide and oxyiodides, which may be used as ignition cones. These cones are especially suitable to initiate chemical oxygen generators since they, in many instances, do not decompose into toxic gas or with unsafe combustion characteristics.

2. Description of the Prior Art

Ignition cone compositions which can reliably start a chemical oxygen generator without introducing undesirable contaminants into the gas stream are extremely rare, if existent at all.

U. S. Pat. No. 2,469,414 describes an ignition cone made of the same materials as the candle proper, but the iron and glass percentages are increased with a corresponding decrease in chlorate. The gas formed contains impurities which are removed by filtration.

U. S. Pat. No. 3,293,187 teaches an ignition cone consisting of a disc or pellet composed of powdered manganese and lithium peroxide. While the gas purity on ignition is not discussed, it is known that it is impure.

W. H. Schecter, in "Chlorate Candles as a Source of Oxygen", *Industrial and Engineering Chemistry*, Vol. 42, page 2,348, Nov. 1950, states that the high temperatures in the cone cause "violent ebullition and spattering of the molten material", and that "the top of the candle may reach red heat unless sufficient heat capacity is present".

J. Littman, in "Research on Sodium Chlorate Candles for the Storage and Supply of Oxygen for Space Exploration", NASA SP-234, pages 291–330, 1970, describes an ignition cone of the following composition:

|  | Primary | Secondary |
|---|---|---|
| Fe | 25% | 30% |
| $BaO_2$ | 66% | 15% |
| Fiberglass | 9% | 25% |
| $NaClO_3$ | 0 | 30% |
| Amount used | 2 gms | 12 gms |

In commenting on these mixtures, he states:

"As with the basic standard formula $NaClO_3$ candle discussed previously, impurities in the chemicals blended into the primary and secondary formulations produced contaminants in the product oxygen stream. This included CO and $CO_2$ contaminants from impurities in the iron powder fuel and the barium peroxide-chlorine evolution suppressant."

SUMMARY OF THE INVENTION

Objectives

An object of this invention is to provide a novel ignition cone.

Another object is to provide an ignition cone which does not decompose into a toxic gas.

Still another object is to provide an ignition cone which is sufficiently sensitive to enable ignition by various means.

A further object is to provide an ignition cone which can be initiated by pyrotechnic or percussion means as well as by water.

A still further object is to provide an ignition cone which can ignite a chemical oxygen generator using the metal barrier technique.

Another object is to provide an ignition cone which does not require a primary and secondary composition as distinct layers therein.

Another object is to provide an ignition cone which is non-liquefying.

Another object is to provide an ignition cone which is odor-free.

Another object is to provide an ignition cone which is incapable of igniting tin plate, yet sufficiently hot to cause ignition of most chemical oxygen generators.

Other objects of the invention will in part be obvious and will in part appear hereinafter.

BROAD STATEMENT OF THE INVENTION

It has now been found that the alkali metal and alkaline earth metal iodides and oxyiodides in combination with one or more alkaline metal mono-oxides as the main oxidizer and usually an auxiliary oxidizer comprising one or more alkaline metal and alkaline earth metal oxides, and chlorates including the perchlorates, produce a most effective ignition cone, when ignited, particularly suited for chemical oxygen generators. More particularly, when an oxidant of the group consisting of 10 to 60 percent by weight of one or more alkaline metal and alkaline earth metal iodides, preferably sodium or potassium iodide; and 10 to 85 percent by weight of one or more alkaline metal and alkaline earth metal oxyiodides, preferably sodium or potassium iodate are combined with 10 to 70 percent by weight of an alkaline metal oxidizer, preferably sodium monoxide and, dependent upon the oxidant utilized, 10 to 70 percent by weight for the iodide oxidant and 0 to 70 percent by weight of an auxiliary oxidizer, preferably sodium peroxide, sodium chlorate, or barium chlorate, a most effective, cool burning, odor-free, non-toxic gas emitting ignition cone, especially suitable for chemical oxygen generators is produced. As will be seen from the description as it proceeds, this composition is far superior to any previously used as an ignition cone for said generators, and, in addition, it is water initiatable, which is most desirable when explosive environments are involved.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

For a fuller understanding of the nature and objects of the invention, reference should be had to the following detailed examples.

DETAILED DESCRIPTION OF THE PREFERRED EMBODIMENTS

EXAMPLE I

The following cone composition for a chemical Oxygen generator is formulated as a first or primary, and a second or secondary composition:

|  | Primary | Secondary |
|---|---|---|
| $NaClO_3$ | 37% by weight | 90% by weight |
| $Na_2O$ | 30% | 6% |

| $Na_2O_2$ | 3% | 4% |
| $NaIO_3$ | 30% | 0 |

The primary composition is poured loosely into the bottom of the mold for the chemical oxygen generator and leveled. Then, the secondary composition is poured in and leveled. Finally, the generator composition is poured in and the entire generator pressed. Since the cone covers the entire top of the generator, ignition will be quite even.

Ignition may be by use of an electrically igniting bridgewire (40 gauge nichrome) with an ignition bead (approximately 0.1 gm). Over the bead is formed a conventional first fire zirconium/barium chromate mixture (21% Zr) (approximately 0.5 gm) to assure complete and rapid ignition of the cone.

Alternatively, ignition or initiation of the cone may be accomplished by the use of a water filled fracturable glass vial containing about 0.1 ml $H_2O$ in association with 2.5 gms of a first fire composition of:

| $NaClO_3$ | 18% by weight |
| $NaIO_3$ | 38% |
| $Na_2O$ | 44% |

The vial is broken by depressing a button on top of the generator. A miniature hypodermic-like syringe built into the generator could also be used.

A gas analysis a short time after ignition, when only the cone is ignited, will reveal the following:

| $Cl_2$ | 0 ppm |
| CO | 10 ppm max. |
| $CO_2$ | 0 ppm |
| $H_2O$ | 7 mg/l |

Gas meets U.S.P. with exception of water vapor.
Other observations will be as follows:
Slow burning
Non-liquefying
Odor Free
Incapable of igniting tin-plate The first fire and the cone composition above will form a white hard ash which is only partially soluble in water.

EXAMPLE II

By enriching the primary composition with sodium iodate, the secondary composition of Example I may be completely eliminated. The resultant composition would be as follows:

| $NaClO_3$ | 9.9% by weight |
| $Na_2O$ | 32.7% |
| $Na_2O_2$ | 2.0% |
| $NaIO_3$ | 55.4% |

Less of the above composition could even be used as the cone. And, it is water-initiatable.

EXAMPLE III

Ten grams of the following cone formulation can ignite a generator by water activation without requiring a first fire or secondary cone:

| $NaIO_3$ (Reagent) | 54.4% by wt. |
| $Na_2O$ (Commercial, powdered) | 34.1% |
| $Ba(ClO_4)_2$ (Lab synthesized) | 11.5% |

EXAMPLE IV

In a situation where the $NaIO_3$ is not as pure as reagent grade, the addition of some zinc peroxide aids in accomplishing satisfactory performance. The following is a typical composition of such:

| $NaIO_3$ (purified powder) | 47.9% by wt. |
| $Na_2O$ (powdered, commercial) | 33.8% |
| $Ca(ClO_4)_2$ (Lab synthesized) | 7.2% |
| $ZnO_2$ (Tech 55% pure) | 11.1% |

EXAMPLE V

Mixtures involving the alkaline earth iodates are also all quite active, igniting in compressed form with $H_2O$. A typical example is:

| $Sr(IO_3)_2$ | 57.8% by weight |
| $Na_2O$ | 32.8% |
| $Sr(ClO_4)_2$ | 9.4% |

A 10 gram, 1 inch diameter pellet ignites with 0.1 ml $H_2O$, and reacts to completion in 12 seconds.

EXAMPLE VI

Iodide formulations provide even more rapid and vigorous ignition than do their iodate counterparts. And they are also less expensive. The following iodide formulation is typical:

| KI | 38.4% by weight |
| $Na_2O$ | 28.8% |
| $NaClO_3$ | 32.8% |

Although this formulation cannot be activated by water in either powder or compressed form, it has the advantage of not being accidentally activated during generator manufacture due to water vapor absorption by powder in the mold. Yet, it is easily ignited with conventional pyrotechnic first fires.

EXAMPLE VII

In J. Littman's "Research on Sodium Chlorate Candles for the Storage and Supply of Oxygen for Space Exploration", NASA SP-234, page 307, Littman describes a cone structure to avoid the introduction of undesirable contaminants into the product oxygen stream of the chemical oxygen generator. A metal barrier is used to separate the ignition, first fire, if used, and the primary from the secondary of the ignition cone. However, burn-out of the barrier wall frequently occurs. Additional problems are caused by melting of the chlorate of the generator away from the hot metal surface to prevent successful ignition. When the pyrotechnic material is replaced by the iodate or iodide ignition mixtures of this invention, successful ignition can be accomplished without metal barrier burn-out. About 0.1 gm of ignition bead material composed of:

| Zr (powder −325 mesh) | 34% by weight |
| Ni (powder −325 mesh) | 23% |
| Potassium perchlorate | 38% |
| Superfloss | 5% | is made into a paste with water and applied to 40 gauge nichrome wire which serves as the bridgewire. The paste is then either oven or air dried.

A first fire composition (0.5 gm) consisting of the conventional 21 percent by weight zirconium/barium chromate mixture is then placed around the ignition bead.

An iodate ignition mixture and cone composed of:

| | |
|---|---|
| NaIO₃ | 54.4% by weight |
| Na₂O | 34.1% |
| Ba(ClO₄)₂ | 11.5% | is formulated. Pyrex glass wool is used around the generator cone as an insulator and particulate filter. A fiber-frax mat is used around the ignition bead and Zr/BaCrO₄ first fire, as these are hot enough to melt glass. A mica disk is placed over the outlet oxygen filter to prevent molten chlorate from entering the mat, breaking down away from the Na₂O₂ and producing chlorine. The disk is sized so that oxygen can pass between it and the tin can wall. A 2 mil copper foil barrier is soldered in place with a 600°F solder. A pinhole vent is placed in the lid to allow escape of ignition gases. The ignition sequence is fairly straightforward. A current is passed through the bridgewire which heats the ignition bead material to its ignition temperature, the ignition bead then starts the first fire, which in turn actuates the iodate ignition material. The reacting iodate mixture heats the copper foil in contact with it to a red heat, without burning through it. The hot foil starts the iodate mixture which, in turn, ignites the generator cone and generator. Since the CO and other objectionable gases are vented outside the product oxygen stream, the gas delivered to the consumer will be of high purity.

The electrical ignition bead/bridgewire may be replaced with a percussion cap or any other conventional source of ignition. The foil may be replaced with a thicker material such as tin-plated steel 9-12 mils thick as a barrier.

The mechanism of the reactions of this invention is not completely clear.

With respect to use of iodate as the oxidant and limiting this discussion to sodium iodate, the reaction is thought to be:

$$4/3 NaIO_3 + 2Na_2O \rightarrow Na_5IO_6 + \tfrac{1}{3} NaI \quad (I)$$

It seems likely that sodium paraperiodate (Na₅IO₆) is formed as follows:

$$NaIO_3 + 2Na_2O + \tfrac{1}{3}NaClO_3 \rightarrow Na_5IO_6 + \tfrac{1}{3}NaCl, \quad (II)$$
$$\text{or } NaIO_3 + Na_2O + Na_2O_2 \rightarrow Na_5IO_6, \text{ or} \quad (III)$$
$$4/3 NaIO_3 + 2Na_2O \rightarrow Na_5IO_6 + \tfrac{1}{3}NaI \quad (IV)$$

There are a number of periodate salts which could also be formed, such as:

meta-(NaIO₄)
dimeso-(Na₄I₂O₉)
meso-(Na₃IO₅)
dipara-(Na₈I₂O₁₁)
diortho-(Na₁₂I₂O₁₃)
ortho-periodate (Na₇IO₇)

The meta-periodate (NaIO₄) reacts with Na₂O with an incandescent glow and, assuming the para-periodate to be the product, the reaction would be:

$$NaIO_4 + 2Na_2O \rightarrow Na_5IO_6 \quad (V)$$

Thus, it seems likely that sodium para-periodate is the primary iodine compound formed.

With respect to iodide as the oxidant and limiting this discussion to sodium iodide, the reaction, which is thought to be:

$$NaIO_3 \rightarrow NaI + 3/2 O_2 \quad (VI)$$

is endothermic, therefore, the reverse will be exothermic. It follows then that a more highly exothermic reaction will occur if the sodium iodate in Equation II is replaced by sodium iodide as follows:

$$NaI + 2 Na_2O + 4/3 NaClO_3 \rightarrow Na_5IO_6 + 4/3 NaCl \quad (VII)$$

Experimentally, it will be found that the iodide provides more rapid and vigorous ignition than do their iodate counterparts. However, the iodide formulations are less sensitive, or more difficult to ignite than their iodate counterparts. It is also more difficult to formulate iodide compositions to give pure oxygen. Fortunately, the iodides are less expensive than the iodates.

The alkaline earth metal chlorates and perchlorates as auxiliary oxidizers are to be avoided in iodide formulations when pure oxygen is required. The smaller heat of formation of the iodides as compared to the iodates leads to higher heats of reaction, and consequently, higher temperatures in the reaction. Na₅IO₆ decomposes at 800°C (see page B–158, *Handbook of Chemistry and Physics*, 50th ed. 1969) so the hotter iodide formulations tend to produce impure oxygen as they approach this temperature.

With respect to Equation II, the periodate can replace the iodate, but it is more expensive. Also, the chlorate may be replaced with perchlorate.

Depending on the speed of ignition required and the method of ignition, i.e. whether electrical or water, the concentration ranges may be:

| | |
|---|---|
| NaClO₃ | 0 to 70% by weight |
| Na₂O | 10 to 70% |
| NaIO₃ | 10 to 85% |

Sodium peroxide Na₂O₂) need only be used to suppress free halogen formation. Usually, more than 5 percent is required.

While the cone will function over a very wide range of compositions, consideration of economics, oxygen liberation, and temperature will usually narrow the above ranges For instance, the relative expense of sodium iodate tends to restrict its use. In contrast, sodium chlorate is low in cost. It appears to furnish most of the oxygen liberated by the cone. So, concentrations heavy in chlorate would be favored. From the temperature standpoint, visual observation of the incandescence of the reaction reveals that the peak temperatures appear to occur when the formulation is stoichiometric. (Equation II). The stoichiometric concentration would be:

| | |
|---|---|
| NaIO₃ | 55.4% by weight |
| Na₂O | 34.7% |
| NaClO₃ | 9.9% |

The iodides and oxyiodides that may be used as the oxidants are those of the alkaline metals and alkaline earth metals. Typical of these are sodium iodide, potassium iodide, sodium iodate, potassium iodate, lithium iodate, magnesium iodate, barium iodate, calcium iodate, strontium iodate, sodium periodate, potassium periodate, and mixtures thereof. From 10 to 60 percent by weight of iodide and 10 to 85 percent by weight of the oxyiodide is the usual concentration range. Pronounced differences in cone activity are noted by the grade of iodide or oxyiodide used. Reagent grade is better than purified powder, which, in turn, is better than production grade. As noted in Example IV, the addition of zinc peroxide is helpful to improve the performance of production grade material. The size of granules used also affects the rate of the reaction and its completeness — the smaller the size, the quicker the rate and the greater possibility of obtaining a complete reaction.

The principal oxidizer that is used should be one or more of the alkaline metal mono-oxides, such as sodium monoxide or potassium monoxide. The concentration range should be from 10 to 70 percent by weight.

The auxiliary oxidizer that must be used when diode is used as the oxidant and that may be used when oxyiodide is used as the oxidant should be one or more of the alkaline metal and alkaline earth metal oxides and chlorates including the chlorates and perchlorates. Typical auxiliary oxidizers are sodium peroxide, potassium peroxide, lithium peroxide, barium peroxide, calcium peroxide, zinc peroxide, sodium superoxide, potassium superoxide, sodium chlorate, potassium chlorate, barium chlorate, sodium perchlorate, lithium perchlorate, potassium perchlorate, barium perchlorate, magnesium perchlorate, calcium perchlorate and strontium perchlorate. The concentration range should be from 10 to 70 percent be weight for iodide and 0 to 70 percent by weight for oxyiodide.

Many of the above iodates may be prepared by either reacting iodic acid and the metal hydroxide followed by evaporation of the water, or by reacting sodium iodate with the metal nitrate, washing the metal iodate precipitate thoroughly, and drying.

It should be noted that the alkaline metal iodates and sodium monoxide mixtures will not ignite with water in compressed form without the presence of an alkaline earth chlorate or perchlorate. The lithium iodate formulations will give off iodine vapor in some instances. Formulations with potassium iodate are the least active of the alkaline metal iodate series. Some magnesium iodate formulations will give off iodine vapor. Commercial grade calcium iodate will give off $I_2$ vapor, while laboratory synthesized material will not, probably due to impurities. Zinc iodate and zinc perchlorate promote small amounts of iodine vapor. Mixtures of sodium iodide and sodium monoxide ignite spontaneously upon addition of zinc perchlorate. When used with alkali metal iodates, the alkaline earth perchlorates perform best.

Some care is required in manufacturing generators with these ignition cones. Because of the extremely deliquescent nature of the materials, powder clinging to the sides of the mold can absorb moisture from the air. When fresh cone material is added, the moisture can cause a spontaneous reaction. Be keeping the laboratory air dry and the mold clean, this can be prevented.

Referring to Example I, initial gas purity from an electrical ignition system is not quite as good as that from the water activated system. A higher level of CO will result, usually from 20 to 40 ppm, due to the higher ignition temperatures and impurities in the pyrotechnic metal powders.

With respect to water initiation, the mechanism by which water activates the first fire is not presently understood. All the iodate formulations described herein can be activated by water when they are loose powder. Some formulations can be ignited with water when they have been pressed into a generator cone. Where the generator is to be used under conditions which will cause water to either boil or freeze, the former can be prevented by sealing the water in a compartment which will sustain some internal pressure; the latter can be alleviated by adding a salt such as $CaCl_2$ to the water to lower the freezing point.

The water initiation reaction may simply be the exothermic reaction of sodium monoxide with water to form sodium hydroxide. Since the steam-sodium monoxide reaction would be more strongly exothermic than the liquid-solid reaction, the loose powder would allow steam to penetrate it, while a dense solid would not. However, when the sodium chlorate of Equation II above is replaced by barium chlorate or perchlorate, or the perchlorate of an alkaline earth metal, the cone will be initiated by liquid water when the mixture is in its compressed form. This may indicate that a sodium-hydrogen periodate (such as $Na_3H_2IO_6$) is formed in the loose powder and an alkaline earth-hydrogen periodate (such as $Ba_2HIO_6$) is formed in the compressed material. Most of the alkaline earth iodate formulations herein will also ignite with water in their compressed forms. More accurate basic thermodynamic information is required on the more complex periodates to clarify the mechanism involved.

It will thus be seen that the objects set forth above, among those made apparent from the preceding description, are efficiently attained, and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

Now that the invention has been described:

What is claimed is:

1. An ignition composition comprising an oxidant of at least one member of the class consisting of the alkaline metal and the alkaline earth metal iodides and oxyiodides, a principal oxidizer consisting of at least one alkaline metal monoxide, and, at least, when an iodide is used as the oxidant, an auxiliary oxidizer comprising at least one member of the class consisting of the alkaline metal and the alkaline earth metal peroxides, and chlorates including the perchlorates.

2. The ignition composition of claim 1 wherein the oxidant is an iodide and comprises 10 to 60 percent by weight, the principal oxidizer comprises 10 to 70 percent by weight and the auxiliary oxidizer comprises 10 to 70 percent by weight of the composition.

3. The ignition composition of claim 1 wherein the oxidant is an oxyiodide and comprises 10 to 85 percent by weight and the principal oxidizer comprises 10 to 70 percent by weight of the composition.

4. The ignition composition of claim 3 wherein an auxiliary oxidizer is used and comprises 0 to 70 percent by weight.

5. The ignition composition of claim 3 wherein the oxyiodide is sodium iodate and the principal oxidizer is sodium monoxide.

6. The ignition composition of claim 2 wherein the oxidant is potassium iodide, the principal oxidizer is sodium monoxide and the auxiliary oxidizer is sodium chlorate.

7. The ignition composition of claim 4 wherein the oxyiodide is sodium iodate, the principal oxidizer is sodium monoxide and the auxiliary oxidizer is sodium chlorate.

8. The ignition composition of claim 1 wherein the oxidant is sodium iodate, the principal oxidizer is sodium monoxide, and the auxiliary oxidizer is a mixture of sodium and magnesium perchlorates.

9. An ignition composition adapted to activate chlorate type oxygen generators which comprises an oxidant selected from the group consisting of sodium iodide, potassium iodide, sodium iodate, potassium iodate, lithium iodate, magnesium iodate, barium iodate, calcium iodate, strontium iodate, sodium periodate, potassium periodate, and mixtures thereof, a principal oxidizer selected from the group consisting of sodium monoxide, potassium monoxide, and mixtures thereof and an auxiliary oxidizer selected from the group consisting of sodium peroxide, potassium peroxide, lithium peroxide, barium peroxide, calcium peroxide, zinc peroxide, sodium superoxide, potassium superoxide, sodium chlorate, potassium chlorate, barium chlorate, sodium perchlorate, lithium perchlorate, potassium perchlorate, barium perchlorate, magnesium perchlorate, calcium perchlorate, strontium perchlorate, and mixtures thereof.

10. The composition of claim 9 wherein the oxidant is present in the amount of 10 to 85 percent by weight of the composition, the principal oxidizer is present in the amount of 10 to 70 percent by weight of the composition, and the auxiliary oxidizer is present in the amount of 10 to 70 percent by weight of the composition.

11. A water-initiated ignition composition for chlorate type oxygen generators comprising an oxidant selected from the group consisting of alkaline metal iodides, alkaline earth metal iodides, alkaline metal oxyiodides, alkaline earth metal oxyiodides, and mixtures thereof, a principal oxidizer selected from the group consisting of one or more alkaline metal monoxides, and at least when an iodide is used as the oxidant an auxiliary oxidizer selected from the group consisting of alkaline metal peroxides, alkaline earth metal peroxides, alkaline metal chlorates, alkaline earth metal chlorates, alkaline metal perchlorates, alkaline earth metal perchlorates, and mixtures thereof.

* * * * *